UNITED STATES PATENT OFFICE.

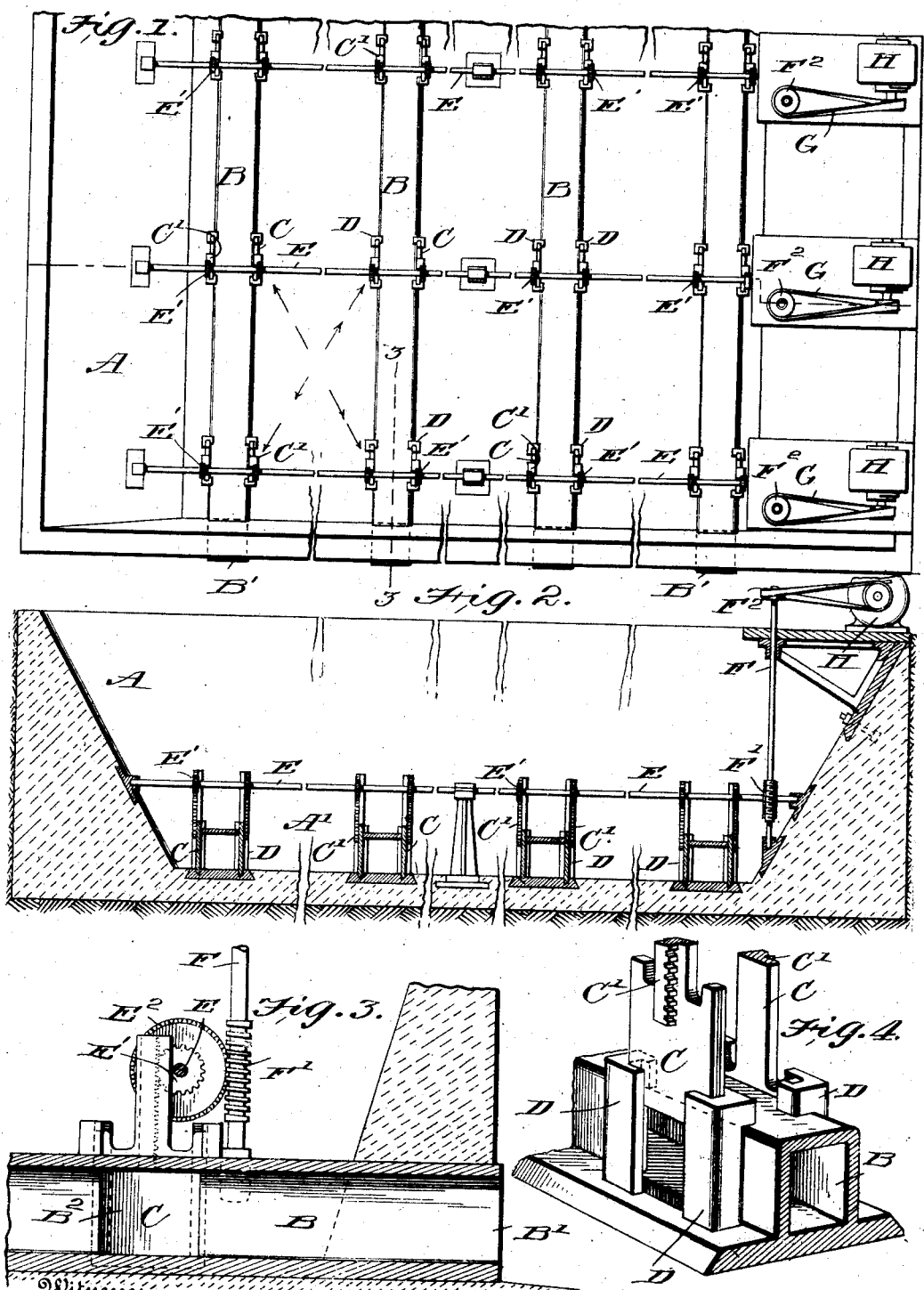

THOMAS J. JACKSON, OF PINE RIDGE, SOUTH DAKOTA.

RESERVOIR.

No. 882,761.      Specification of Letters Patent.      Patented March 24, 1908.

Application filed January 25, 1908. Serial No. 412,605.

*To all whom it may concern:*

Be it known that I, THOMAS J. JACKSON, a citizen of the United States, and a resident of Pine Ridge, in the county of Shannon and State of South Dakota, have invented certain new and useful Improvements in Reservoirs, of which the following is a specification.

This invention is an improvement in devices for removing sediment from large reservoirs, such for instance, as those used in the western portions of the United States for irrigation purposes, wherein rivers are dammed and the water accumulated for miles and then withdrawn for irrigation purposes; and the invention consists in certain novel constructions and combinations of parts as will be hereinafter described and claimed.

In the drawing Figure 1 is a top plan view partly broken away, and Fig. 2 is a cross-section partly broken away of a reservoir embodying the invention. Fig. 3 is a detail sectional view on about line 3—3 of Fig. 1, and Fig. 4 is a detail perspective view illustrating the valves or gates for controlling the inlet openings leading to the conduits.

In reservoirs of this character difficulty is experienced from the accumulation of sediment, the deposits in a few years accumulating to such extent as to materially limit and finally destroy the water-holding capacity of the reservoir. It is therefore important to provide a simple inexpensive means for effectively cleaning out the sediment or deposit. This not only maintains the capacity of the reservoir but it permits the utilization of the sediment in replenishing soil for agricultural purposes which is important as is well known by those skilled in the art. In carrying out my invention I provide on the floor $A'$ of the reservoir A a number of approximately parallel conduits B opening at one end $B'$ below the end of the dam $A^2$ of the reservoir and provided with inlet openings $B^2$ through which the sediment may enter the conduits when the valves or gates C are opened.

By preference the conduits B extend lengthwise in the direction of length of the reservoir and these drainage conduits have their inlet openings arranged in series extending transversely or laterally and the valves C controlling the inlet openings of their respective series are operated by a common operating mechanism so that the valves in such transverse series are all opened and closed at the same time. By this construction I establish currents between the adjacent conduits and leading to the openings $B^2$ facing each other so that the sediment accumulated between the conduits is caused to circulate to pass to the inlet openings $B^2$ and be discharged thence through the conduits and at the open ends $B'$ thereof, and when the several valves of the two adjacent transverse series are opened, it will be noticed that currents will be set up, as indicated in Fig. 1, tending to scour out the sediment or deposit between the valves, and thus facilitating the discharge of the sediment or deposit through the conduits.

The valves C are in the form of gates sliding vertically in upright guides D on opposite sides of the inlet openings $B^2$ and these gates are provided with racks $C'$ with which are meshed pinions $E'$ on cross shafts E mounted in suitable bearings and extending across the several conduits B. Each of the shafts E is provided with a worm wheel $E^2$, and these worm wheels $E^2$ are meshed with worms $F'$ on upright shafts F which latter may be turned by hand in some instances, but may preferably be operated by power to which end I provide them at their upper ends with pulleys $F^2$ which may be geared by suitable belts G with any suitable motor power. For purposes of illustration, I have shown in Fig. 1 an electric motor H, which may be of any approved type and geared to drive the belt G whenever desired.

It will be noticed that the conduits are mounted on the bottom of the floor of the reservoir and this permits the formation of the inlet openings in the sides of the conduits so the currents leading to said openings may extend laterally and so the valves may be arranged to move vertically for convenient operation by means common to the several valves in the transverse or lateral series.

As will be understood from Fig 1, the inlet openings $B^2$ to the several conduits are arranged throughout their length and in suitable numbers to insure the cleaning of the entire area of the reservoir bed, the conduits discharging at their ends $B'$ through the dam at the lower end of the reservoir, and arranged as shown and described for operating the several valves, permitting me to clean the bottom of any portion of the reservoir so that the bottom can be kept clean at all times, thus preserving the usefulness of the reservoir and avoiding the necessity of any expensive dredging operations.

In operation it is manifest the great volume and height of the water will create a tremendous pressure of water out of the openings in the conduits.

In utilizing the discharged sediment it will be understood that this may be done by means of diversion dams below or in other suitable manner.

I claim—

1. A reservoir having upon its bottom or floor a series of approximately parallel drainage conduits having the outlet openings in their sides, the adjacent outlet openings in the several conduits being opposite each other and the openings of the several conduits being arranged in transverse or lateral series, upright valve guides on the opposite sides of the inlet openings, valves movable vertically in said guides and having racks, cross-shafts common to the several valves of their respective series and having pinions meshing with the racks of the said valves, worm wheels on the said cross-shafts, and upright shafts having worms meshing with their respective worm wheels, all substantially as and for the purposes set forth.

2. A reservoir having a series of approximately parallel drainage conduits provided with inlet openings, the inlet openings of the several conduits being arranged in transverse series crossing the reservoir, valves controlling said inlets and arranged in corresponding transverse series, and means common to the valves of the transverse series for operating the same.

3. The combination of a reservoir, a series of approximately parallel drainage conduits at the bottom thereof and having inlet openings, and valves controlling the same, and arranged in transverse or laterally extending series, and means common to the several valves of the transverse series for operating said valves as and for the purpose set forth.

4. A reservoir having upon its bottom drainage conduits provided in their upright sides with inlet openings through which water, sediment and the like may enter such conduits, and valves controlling said inlet openings, substantially as set forth.

5. A reservoir having upon its floor or bottom a series of approximately parallel drainage conduits provided in their upright sides with inlet openings through which water may enter said conduits, the inlet openings of the several conduits being arranged in transverse or laterally extending series, valves controlling said openings, and means common to the several valves of the transverse series for operating said valves, substantially as set forth.

6. A reservoir having upon its floor or bottom a series of approximately parallel drainage conduits with outlet openings in their upright sides and valves controlling the said openings and arranged in series transverse to the direction of length of the conduits, cross shafts, means whereby said shafts may be turned, and gearing between the cross-shafts, and the valves of their respective transverse series, substantially as set forth.

7. A reservoir having upon its floor or bottom a series of drainage conduits provided in their upright sides with openings and having upright guides alongside the said openings, the openings in the several conduits being arranged in series extending transverse to the direction of length of their respective conduits, valves controlling said openings, and means whereby to operate the said valves, substantially as set forth.

THOMAS J. JACKSON.

Witnesses:
FRANCIS C. BARRY,
PERRY B. TURPIN.